United States Patent
Rapp et al.

(10) Patent No.: US 12,011,995 B2
(45) Date of Patent: Jun. 18, 2024

(54) ELECTRIC DRIVE UNIT WITH A DISCONNECT ASSEMBLY AND METHOD FOR OPERATION OF SAID ASSEMBLY

(71) Applicant: Dana Automotive Systems Group, LLC, Maumee, OH (US)

(72) Inventors: Jeremy A. Rapp, Maumee, OH (US); Nathan Mandery, Perrysburg, OH (US); Kyle Mourdock, Bowling Green, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 105 days.

(21) Appl. No.: 17/804,507

(22) Filed: May 27, 2022

(65) Prior Publication Data

US 2023/0382222 A1 Nov. 30, 2023

(51) Int. Cl.
| | |
|---|---|
| *F16H 48/24* | (2006.01) |
| *B60K 23/08* | (2006.01) |
| *F16D 11/10* | (2006.01) |
| *F16D 27/118* | (2006.01) |

(52) U.S. Cl.
CPC ............. *B60K 23/08* (2013.01); *F16D 11/10* (2013.01); *F16D 27/118* (2013.01); *F16H 48/24* (2013.01); *B60K 2023/0875* (2013.01)

(58) Field of Classification Search
CPC ........ F16H 48/24; F16D 11/10; F16D 27/118; B60K 23/08; B60K 2023/0875
See application file for complete search history.

(56) References Cited

U.S. PATENT DOCUMENTS

| | | | |
|---|---|---|---|
| 5,038,884 A | 8/1991 | Hamada et al. | |
| 5,759,129 A * | 6/1998 | Zentmyer | F16H 48/08 192/93 R |
| 7,863,789 B2 | 1/2011 | Zepp et al. | |
| 9,011,289 B2 | 4/2015 | Goleski et al. | |
| 10,830,292 B2 | 11/2020 | Kuwahara | |
| 2002/0019284 A1* | 2/2002 | Aikawa | B60K 6/52 903/952 |
| 2017/0198800 A1* | 7/2017 | Onitake | F16D 11/14 |
| 2017/0297428 A1* | 10/2017 | Inose | F16D 27/112 |
| 2017/0298996 A1* | 10/2017 | Mayr | B60K 17/3462 |
| 2021/0148415 A1* | 5/2021 | Bolle | F16D 11/10 |

FOREIGN PATENT DOCUMENTS

| | | | | |
|---|---|---|---|---|
| DE | 102018210691 A1 | 1/2020 | | |
| WO | WO-2015071736 A2 * | 5/2015 | ............... | B60K 6/36 |
| WO | WO-2021113159 A1 * | 6/2021 | ............... | B60K 1/00 |

* cited by examiner

*Primary Examiner* — Lori Wu
(74) *Attorney, Agent, or Firm* — McCoy Russell LLP

(57) ABSTRACT

Methods and systems are provided for a disconnect assembly in an electric drive unit. In one example, the system includes a dog clutch positioned in a differential, configured to selectively mechanically decouple an electric motor from one or more drive wheels, and including a first interface designed to selectively engage a second interface. In such an example, each of the first interface and the second interface include a plurality of teeth, each tooth in the plurality of teeth includes a drive flank and a coast flank, and the coast flank has a first tooth angle greater than a second tooth angle of the drive flank.

18 Claims, 8 Drawing Sheets

ELECTRIC DRIVE UNIT WITH A DISCONNECT ASSEMBLY AND METHOD FOR OPERATION OF SAID ASSEMBLY

TECHNICAL FIELD

The present description relates generally to methods and systems for a disconnect assembly in an electric drive unit of a vehicle.

BACKGROUND AND SUMMARY

In automotive applications, electric drive units with traction motors are used to generate motive power, among other functions. Some electric drives use permanent magnet (PM) motors. PM motors include permanent magnets embedded in the rotor that electromagnetically interact with a stator. When the power supply to the PM motor is discontinued, the magnetic field in the permanent magnets changes, and in response to the changing magnetic field, a magnetic drag torque on the rotor of the PM motor is induced. the magnetic drag torque may specifically include a hysteretic component and an eddy current component.

Attempts have been made to reduce the magnetic drag torque in PM motors. One approach for decoupling the PM motor in order to decrease magnetic drag toque is taught by Zepp et al. in U.S. Pat. No. 7,863,789. Therein, Zepp introduces a PM electric motor that includes a rotor. The rotor includes permanent magnets embedded therein. In Zepp's motor, a stator concentrically surrounding the rotor along the same axis, and an actuator allowing continuous axial shifting of the rotor along the shaft with respect to the stator. By allowing the rotor to shift axially with respect to the stator via application of the actuator, the magnetic interaction between the stator and the rotor may be reduced as the rotor is shifted out of the envelope of the stator, thereby reducing magnetic drag torque induced within the permanent magnet and iron losses within the stator windings.

However, the inventors herein have recognized potential issues with such systems. For instance, during operation of the Zepp's electric motor with voltage being supplied to the stator, current is supplied throughout the stator, thereby increasing powertrain inefficiencies. Additionally, Zepp's system for shifting the rotor to decrease drag torque may exhibit latency. Further, the inventors have unexpectedly recognized that it may be desirable to rotationally decouple the motor from the drive wheels at a location closer to the drive wheels, to decrease driveline losses, during wheel disconnect.

The issues described above may be at least partially addressed by an electric vehicle system. The system includes, in one example, a dog clutch that is positioned in a differential. The dog clutch is configured to selectively mechanically decouple an electric motor from one or more drive wheels. Thus, the dog clutch functions as a disconnect device. The dog clutch includes a first interface designed to selectively engage a second interface. Each of the first interface and the second interface include a plurality of teeth, each tooth in the plurality of teeth includes a drive flank and a coast flank, and the coast flank has a first tooth angle greater than a second tooth angle of the drive flank. Designing a clutch with a coast flank and drive flange with this angular arrangement, reduces the disengagement force demanded to disengage the clutch and decouple the motor from the drive wheels. Consequently, the clutch may be more efficiently and rapidly disconnected when compared to clutches with symmetric coast and drive flanks.

As one example, the electric motor may be a PM motor and the system may further include a solenoid designed to engage the dog clutch and an internal spring designed to disengage the dog clutch and reduce the chance of (e.g., prevent) unintentional engagement. In such an example, the system may further include a controller designed to energize the solenoid to engage the dog clutch. Conversely, when the PM loses power, the solenoid may be de-energized and the spring functions to disengage the dog clutch. In this way, the dog clutch is automatically disengaged in the event of motor power loss to decrease transmission losses and avoid undesirable driveline behavior in the event of motor power loss. Consequently, the transmission's performance is enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
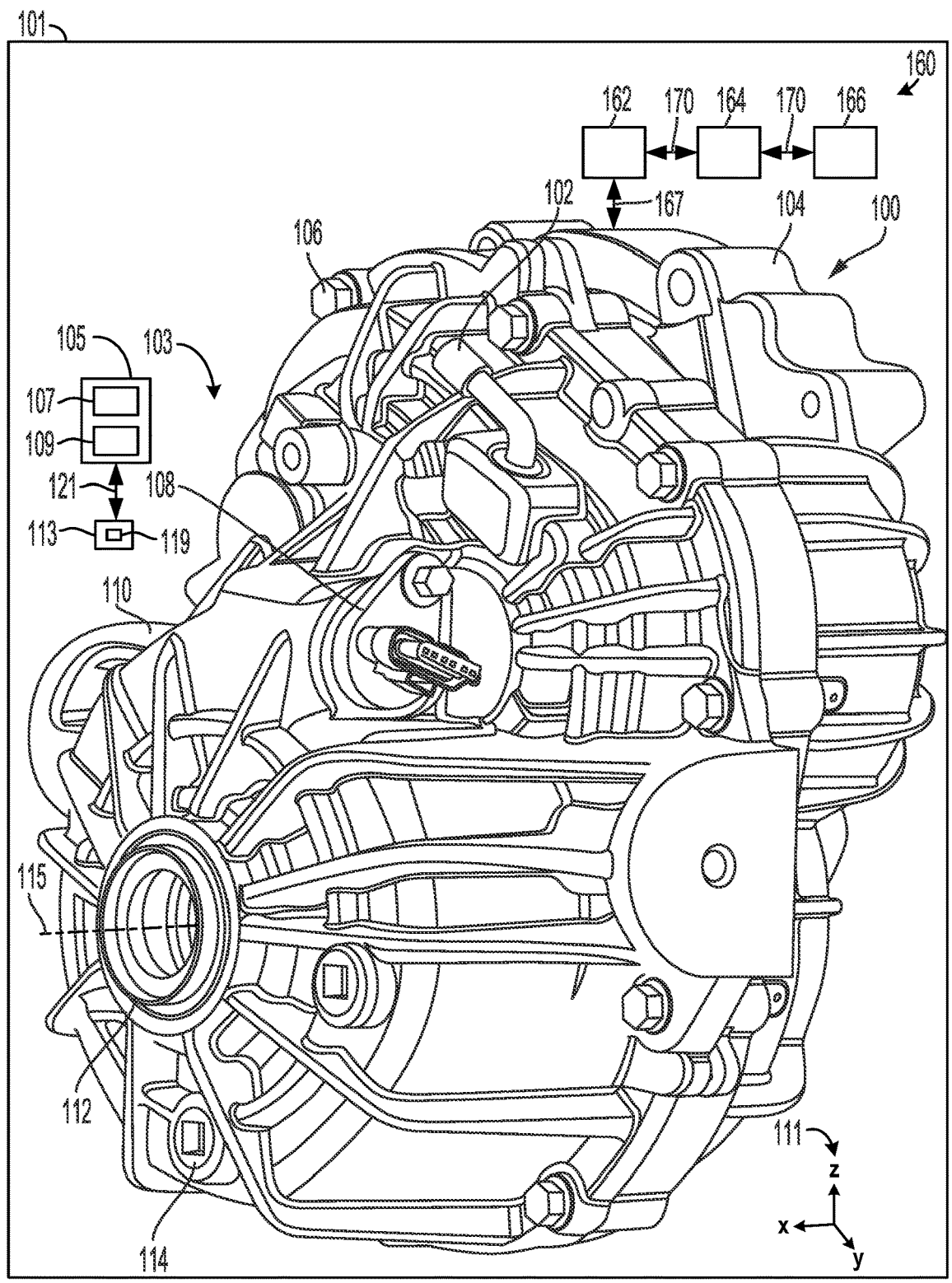
FIG. 1A shows an example gearbox that may be included in an electric vehicle.
Figure 1B:
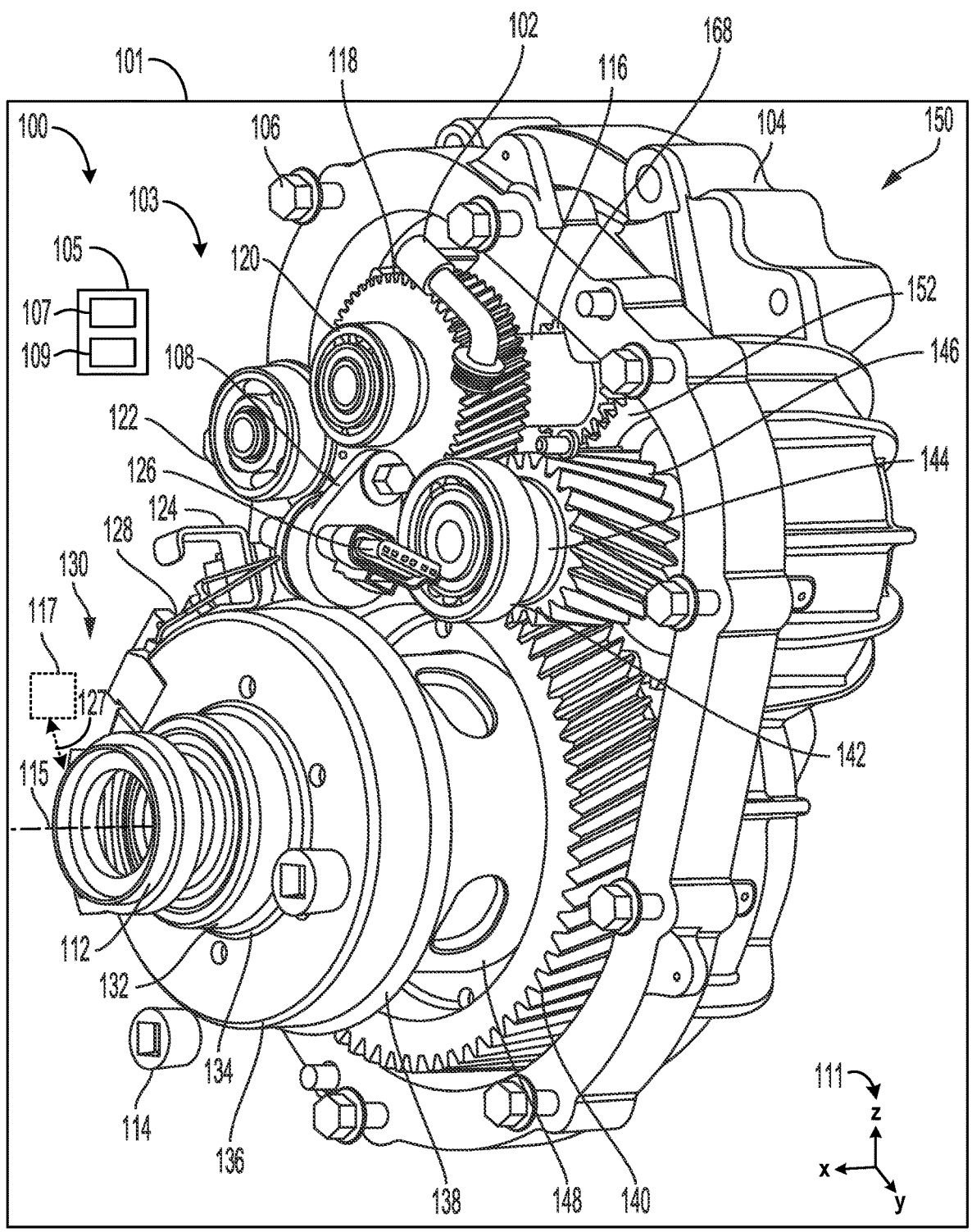
FIG. 1B shows the example gearbox of FIG. 1A with a cover removed, illustrating a transmission included therein.
Figure 2:
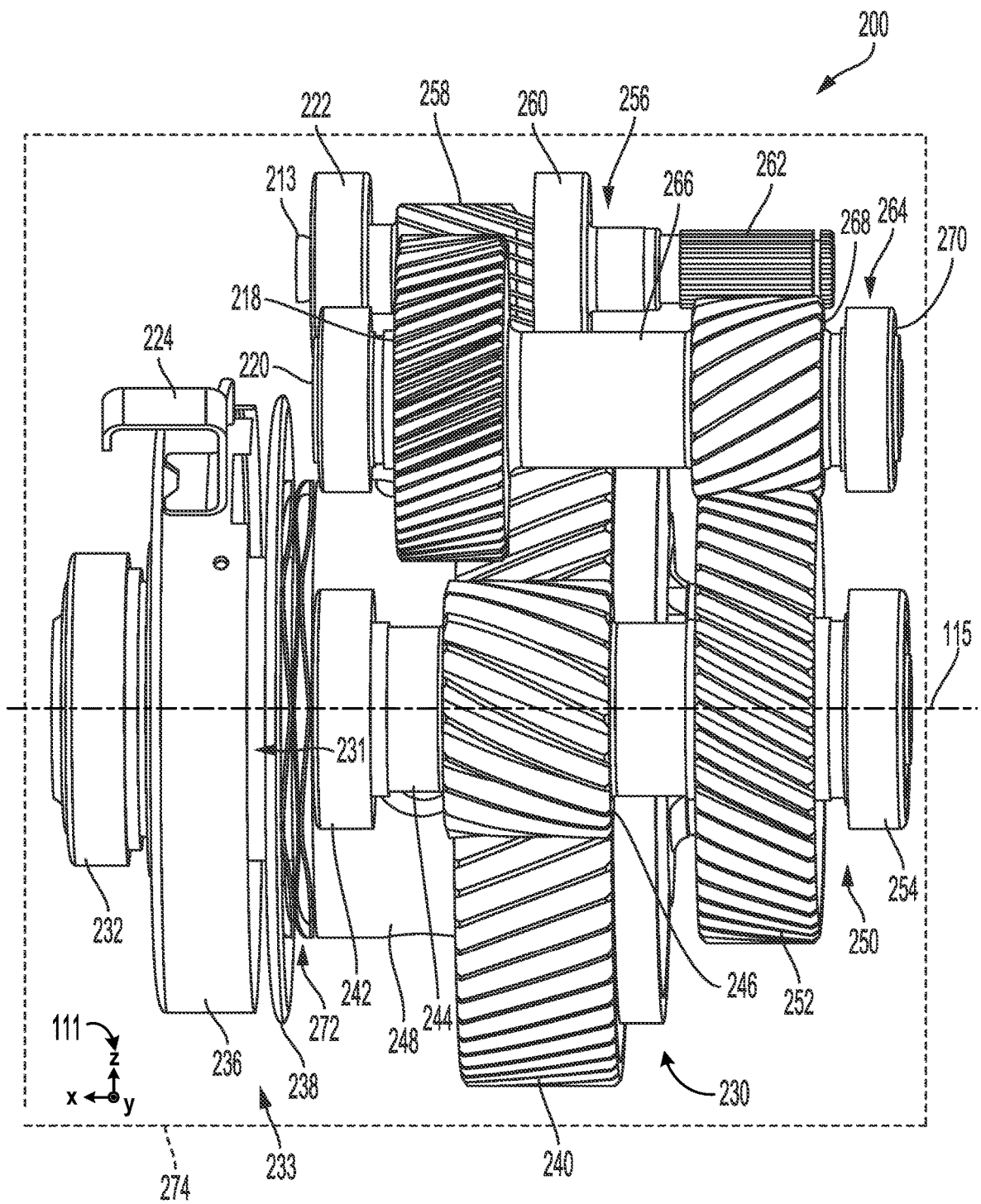
FIG. 2 shows a side view of the transmission of FIG. 1B.
Figure 5:
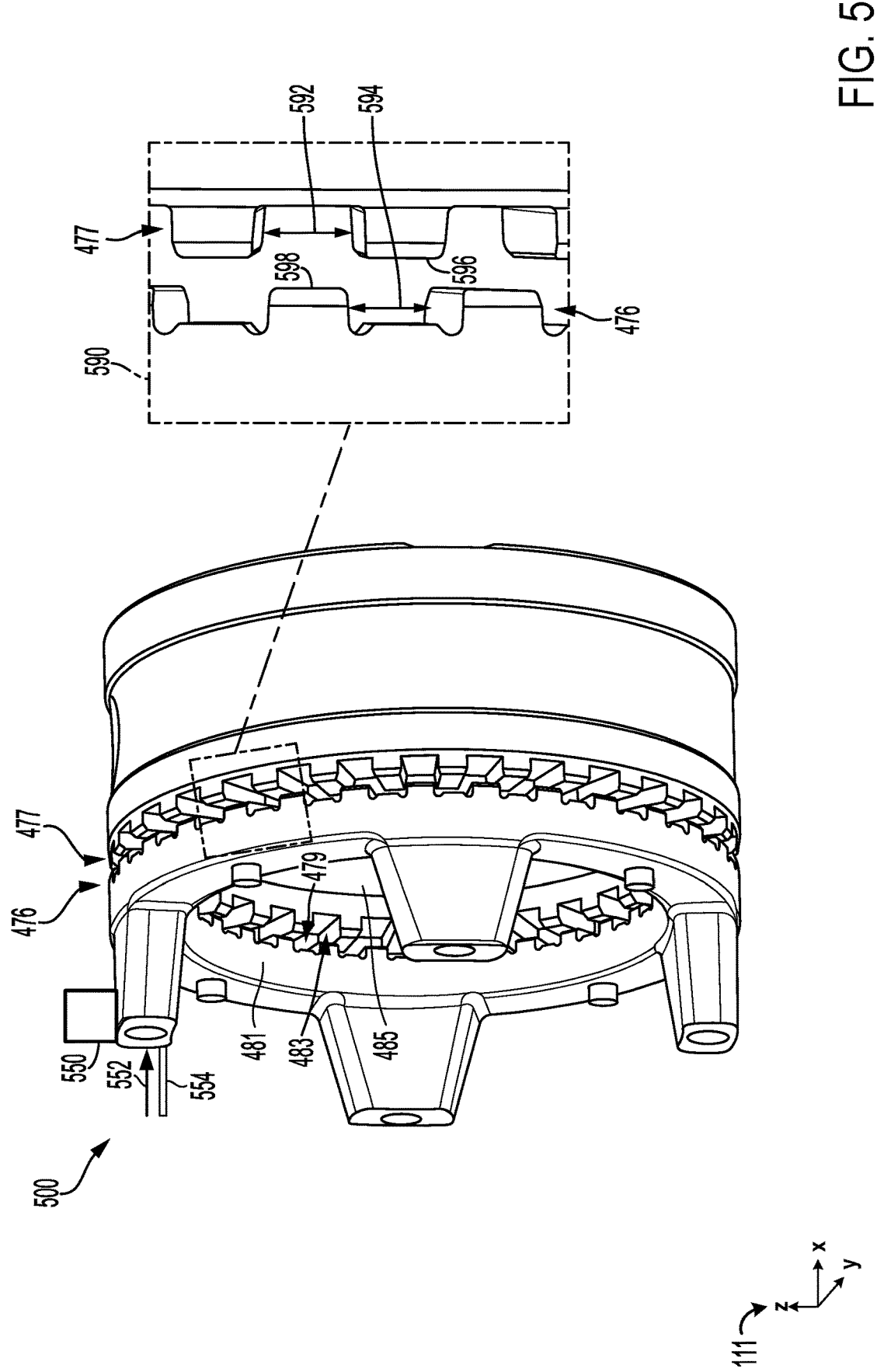
FIG. 5 shows an example dog clutch of a disconnect assembly of the transmission of FIG. 1B.
Figure 6:
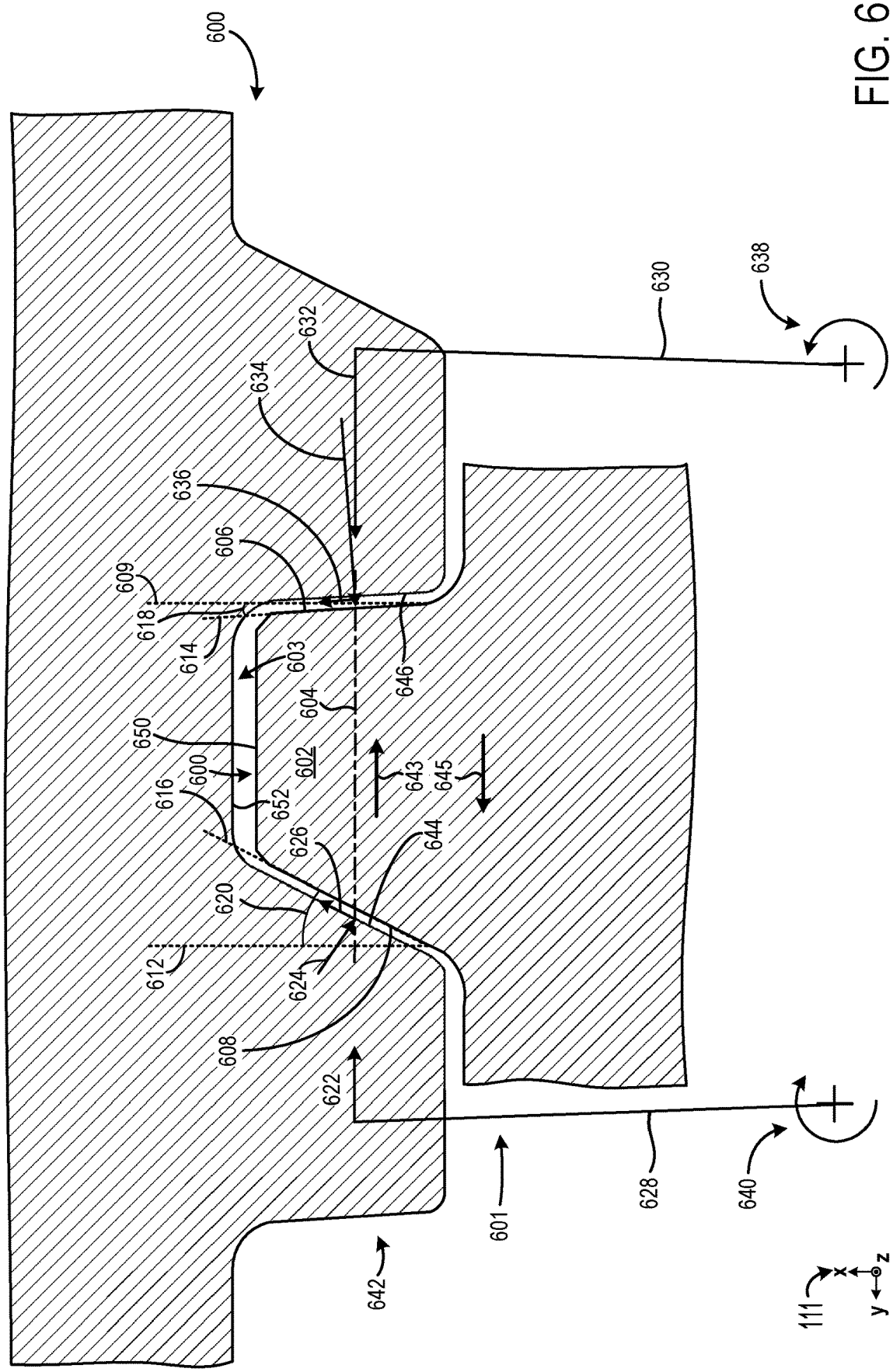
FIG. 6 shows a schematic example of a dog tooth of the dog clutch of FIG. 5, including different angles for a coast flank and a drive flank.
Figure 7:
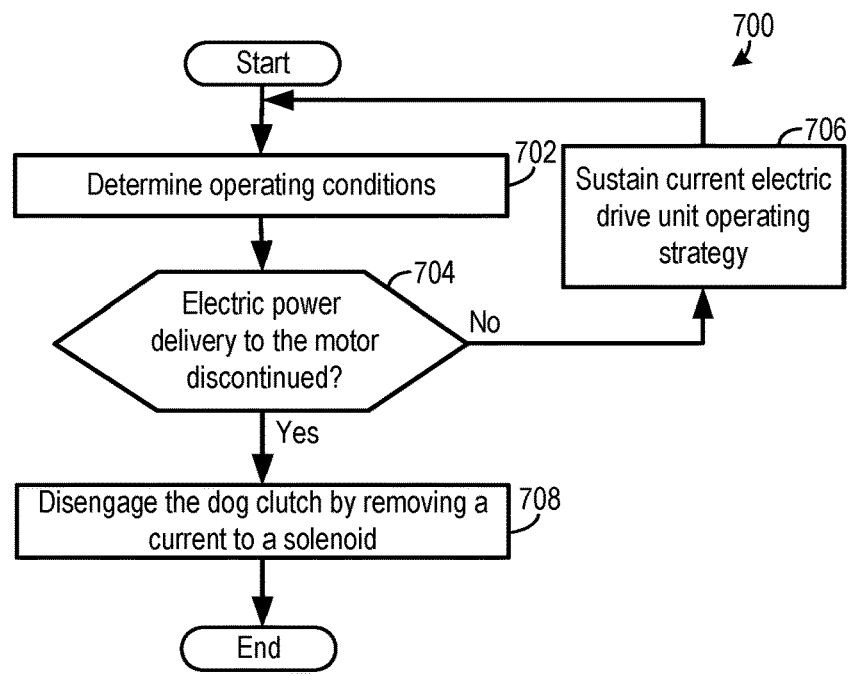
FIG. 7 shows an example method for disengaging the disconnect assembly to decouple drive wheels in response to the motor losing.
Figure 8:
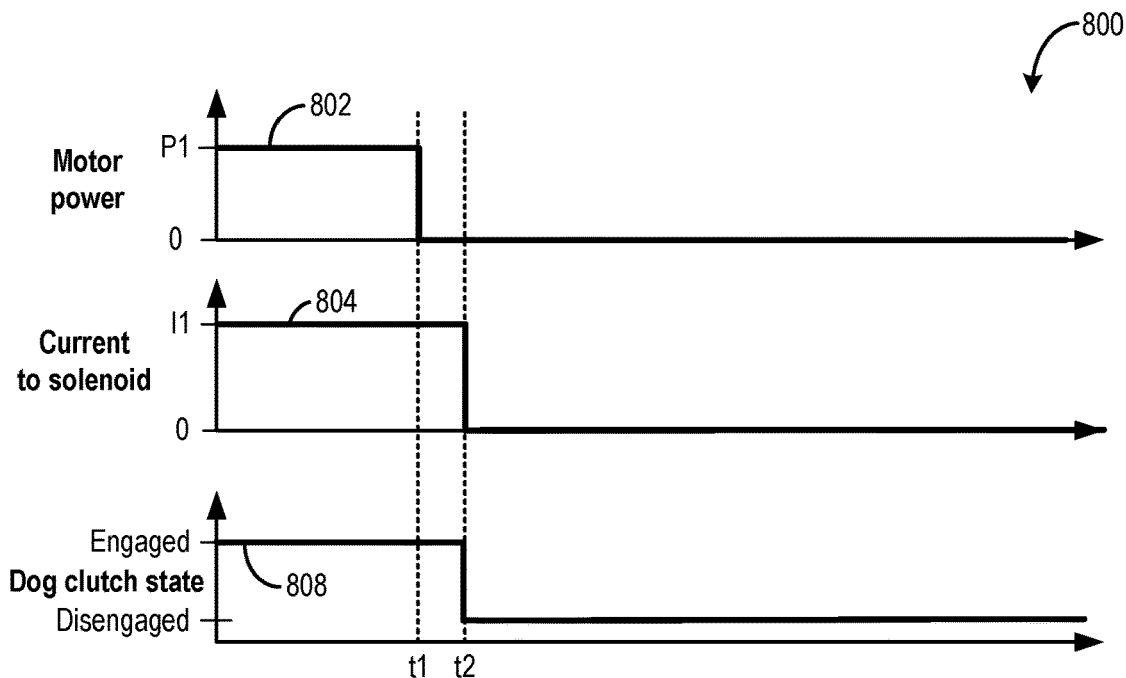
FIG. 8 shows an example timeline for removing a current to a solenoid actuator of the disconnect assembly, as part of decoupling the motor from the drive wheels in response to the motor being unpowered.

The following description relates to systems and methods for operating a dog clutch of a disconnect assembly for an electric drive unit. The electric motor may be coupled to a transmission, which may be included in a gearbox, as shown in FIG. 1A. FIG. 1B shows an opened view of the gearbox with the transmission included therein. The transmission may include one or more gears in a gear train, in addition to the disconnect assembly, as shown in FIG. 2. The electric motor may couple to the transmission, as shown schematically in FIG. 3. The gear train may transfer power from the electric motor to drive wheels of a vehicle via a differential; a cross-sectional view of the differential is given in FIG. 4. Also coupled to the differential is the disconnect assembly, which may discontinue the transfer of power from the electric motor to the drive wheels of the vehicle via separating two gears of a dog clutch, thereby mechanically decoupling the transmission from the drive wheels; details of the two gears of the dog clutch are depicted in FIG. 5. Each tooth of a gear of the dog clutch may have two flanks, a drive flank and a coast flank, both of which may allow intermeshing of the two gears of the dog clutch. FIG. 6 shows a tooth of dog clutch interface with a coast flank and a drive flank, with the angle of the coast flank being shallower than the angle of the drive flank. The disconnect assembly may disengage the dog clutch by de-energizing a solenoid of the disconnect assembly; a method for doing so is shown in FIG. 7. Further, a use-case timing diagram for disengaging a dog clutch is shown in FIG. 8.

An axis system 111 is provided in FIG. 1A as well as FIGS. 1B-6, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. A rotational axis 115 of the differential 400 is further provided in FIGS. 1A-4, for reference. It will be understood that the rotational axis 115 may be the rotational axis of the axle shafts in the differential. As described herein, axial movement may refer to a component's movement along a direction parallel to the rotational axis. FIGS. 1A-B, 2, 4, 5, and 6 are drawn approximately to scale. However, other relative dimensions of the components may be used, in other embodiments.

FIG. 1A shows a gearbox 100, which may be included as part of a transmission system of a vehicle, the vehicle schematically depicted at 101. The vehicle 101 may be a light, medium, or heavy duty vehicle.

The vehicle 101 includes an electric drive unit 160. As such, the vehicle 101 may be an electric vehicle (e.g., an all-electric vehicle or a hybrid electric vehicle which includes an internal combustion engine). To elaborate, the electric drive unit 160 may provide motive power to one or more drive axles. For instance, in one use-case example, the electric drive unit 160 may include two electric axles with separate traction motors. Alternatively, the electric drive unit may include one traction motor that distributes motive power to one or both of the drive axles based on vehicle operating conditions and/or operator predilection. In either example, the electric drive unit may be a four-wheel electric drive unit (e.g., all-wheel electric drive unit) where front and rear drive wheels may receive motive power during certain operating conditions. In the hybrid vehicle embodiment, the vehicle may include an axle receiving motive power from an electric motor and another axle that receives motive power from an internal combustion engine, during drive operation. Further, in other examples, the electric drive unit may be incorporated into a front wheel drive powertrain or a rear wheel drive powertrain.

The gearbox 100 may enclose components of a transmission system therein, and may include a split housing 103 that encloses the transmission system, the split housing 103 including a lower part 104 and an upper part 110. The lower part 104 of the split housing 103 may be configured to hold the lubrication oil. The upper part 110 of the split housing 103 may be configured to the enclosure of the split housing 103, and provide mechanical integrity to the housing. The lower part 104 and the upper part 110 of the split housing 103 may each have mating surfaces that are configured to be in face-sharing contact in order to seal the split housing 103. In particular, the seal generated by face-sharing contact of the upper part 110 and the lower part 104 of the split housing 103 may be designed in order to reduce fluid leakage from the split housing, and reduce fatigue of the split housing. The mating surfaces of the upper part 110 and the lower part 104 may be fastened to be in face-sharing contact with each other via a plurality of bolts 106. The bolts may be fastened such that the bodies of the bolts of the plurality of bolts 106 may penetrate through each mating surface of the upper part 110 and the lower part 104, while the heads of the respective bolts of the plurality of bolts may be in face-sharing contact with the side of the upper part 110 opposite the mating surface of the upper part 110. In the embodiment depicted in FIG. 1A, the gearbox 100 is shown including multiple bolts. In some examples, the upper part 110 and the lower part 104 of the housing of the gearbox 100 may be made from cast iron or aluminum via mold casting or shell molding.

Included on the surface opposite the mating surface of the upper part 110 of the split housing 103 is an output seal 112 which may be coupled to an output interface such as an output flange or shaft.

Further included in the gearbox 100 and projecting out from the upper part 110 of the split housing 103 is a vent pipe 102. The vent pipe 102 may be configured to allow venting from the gear box assembly.

The gearbox 100 may also include electrical port 108 that project out from the upper part 110 of the split housing 103. Electrical port 108 may provide electrical connections for one or more sensors and/or actuators included within the gearbox 100, including for temperature sensors, speed sensors, an actuator for solenoid engagement (to be explained further in relation to FIGS. 1B-2), and so on. Additionally, the upper part 110 of the split housing 103 may include one or more fasteners 114 removably coupling the housing pieces to one another.

The sensors and/or actuators receiving electrical power via electrical port 108 may be in electronic communication with a vehicle controller 105 (e.g., electronic control unit (ECU)) via wired and/or wireless communication. The vehicle controller may be designed to implement control strategies such as engine control, motor control, powertrain control, and the like. To accomplish the aforementioned vehicle control functionality, the vehicle controller may include memory 107 which stores instructions executable by a processor 109 to carry out the vehicle control strategies described herein.

One or more input devices 113 such as a drive mode selector 119, accelerator pedal, brake pedal, touch interface, combinations thereof, and the like may be in electronic communication with the controller 105 as denoted by arrows 121. The drive mode selector 119 may be a button, switch, touch interface, slider, or combinations thereof that allows the vehicle operator to trigger disconnection of the transmission 150 from the drive wheels. For instance, the drive mode selector may allow the vehicle to switch from a two-wheel drive mode to a four-wheel drive mode, when the vehicle includes a second electric axle.

An electric motor 162 is further schematically depicted in FIG. 1A. The electric motor 162 is designed to provide mechanical power to the gearbox 100. The electric motor 162 may be a permanent magnet (PM) type motor that may be more generally an alternating current (AC) motor. In such an example, the electric motor 162 receives electric power from an inverter 164 that in turn receives electric energy from one or more energy storage device(s) 166 (e.g., traction batteries, capacitors, combinations thereof, and the like). Arrows 167 denotes the mechanical power transfer between the motor 162 and the gearbox 100. Arrows 170 denotes the electric power transfer between the electric motor 162, the inverter 164, and the energy storage device(s) 166.

FIG. 1B shows an exposed view of the gearbox 100, with the upper part 110 of the split housing 103 depicted in FIG.

1A removed from the gearbox in order to show the components included therein. Components that are shared by FIGS. 1A-B may share the same label.

Included within the gearbox 100 are multiple intermeshing gears contained within the split housing 103, as part of a transmission system 150. The given embodiment of the transmission 150 may be a single-speed transmission, with three stages; however, other gear train embodiments may be used, in other examples.

Input from a first shaft mechanically coupled to an electric motor via a spline coupling may transfer the electrical power of the motor into a rotational power of the first shaft. The first shaft may be mechanically coupled to a first gear, which may be concentrically aligned with the first shaft, and which in the embodiment given may be a helical gear. The first shaft and first gear may co-rotate relative to the split housing via a first bearing 122, which may be mechanically coupled to each of the split housing 103 and the first shaft at an end of the first shaft proximal to the first gear. The first bearing 122 and/or the other bearings described herein may be ball bearings, such as a deep-groove ball bearing, angular contact ball bearings, roller bearings, and the like.

Intermeshing with the first gear is the second gear 118. The second gear 118 may be mechanically coupled to a second shaft 116, with the second gear concentrically aligned with the second shaft. The second gear 118 may be a helical gear. The first shaft and the second shaft 116 may be parallel to each other, with the rotation of the first gear causing co-rotation of the second gear and the second shaft, due to the intermeshing of the first gear and the second gear. The co-rotation of the second gear 118 and the second shaft 116 with respect to the split housing 103 may be permitted via a second bearing 120, which may be mechanically coupled to the second shaft 116 and to the housing at an end of the second shaft proximal to the second gear 118.

At an end of the second shaft 116 opposite the second gear 118 is the third gear 168, which may be mechanically coupled to the second shaft and concentrically aligned therewith. The third gear 168 may be a helical gear. The third gear co-rotates with each of the first gear and the second gear 118, relative to the split housing 103. The third gear may intermesh with the fourth gear 152, thereby transmitting rotational power of the second shaft to a third shaft 144.

The third shaft 144 may be parallel to each of the first shaft and the second shaft 116. The third shaft 144 may include the fourth gear 152 mechanically coupled to and concentrically aligned with the third shaft at one end of the third shaft, intermeshing with the third gear, and a fifth gear 146 mechanically coupled to and concentrically aligned with the third shaft at an opposite end of the third shaft. Each of the fourth gear 152 and the fifth gear 146 may co-rotate with the third shaft 144, with respect to the stationary split housing 103, and each of the fourth gear 152 and the fifth gear 146 may be helical gears. The rotational motion of the third shaft 144 with respect to the stationary split housing 103 may be permitted via the third bearing 142, which may be mechanically coupled to each of the third shaft and the upper part of the split housing, at an end of the third shaft proximal to the fifth gear 146.

The fifth gear 146 may intermesh with a gear 140 (e.g., ring gear) of a differential 130, which may induce rotation of the case 148 of the differential along a rotational axis 115. The rotational axis 115 of the differential 130 may be parallel to the longitudinal axes of each of the first shaft, the second shaft 116 and the third shaft 144, and the gear 140 of the differential 130 may be mechanically coupled to and concentrically aligned along the rotational axis. Mechanically coupled to the case 148 of the differential 130 and placed linearly in front of the gear 140 in the x-direction is a flange 138 which projects radially outward from rotational axis 115 of the differential 130. The flange may be mechanically coupled to and support a solenoid actuator 136, which may be used to selectively permit power transfer from the electric motor to drive wheels 117 (denoted schematically by a dashed box in FIG. 1B) of the vehicle 101 (as explained in relation to FIGS. 3-6), with the coupling between the differential 130 and the drive wheels 117 denoted by dashed line 127. The solenoid actuator 136 may include a piston, which may be actuated by a solenoid in order to selectively permit power flow to the drive wheels 117. Further included along the rotational axis 115 of the differential 130 in face sharing contact with the shim 134 is a fourth bearing 132, which may be mechanically coupled to each of the upper part 110 of the split housing 103 and the shim 134, and which may permit rotational motion of the case 148 of the differential with respect to the upper part of the split housing. An output shaft of the transmission system 150 may mechanically couple to the differential 130 along rotational axis 115 of the differential, and may rotate with respect to the split housing 103 via the fourth bearing.

A set of wires 128 may be electrically coupled to the solenoid actuator 136, and may be held in place by a bracket 124 mechanically coupled to the solenoid actuator 136. The wires 128 may electrically couple the solenoid actuator 136 to the electrical port 108, which may be coupled to the controller 105, shown in FIG. 1A and/or a power source in order to supply current to the solenoid actuator 136. In particular, the electrical port 108 may include outlet 126.

FIG. 2 shows the internal components of the transmission 200 included within the gearbox 100 of FIGS. 1A-B. It will be appreciated that components of the transmission 200 having substantially similar function to components of the transmission system 150 may be labeled with corresponding numbers, prefixed with a "2" instead of a "1". For example, the solenoid actuator 236 may be substantially similar to the solenoid actuator 136. Accordingly, only additional features of the transmission 200 or those features of the viewing transmission having significant configurational distinctions from corresponding features of the transmission system 150 may be described in detail below; description of all other features of the transmission 200 may be supplemented by description of the corresponding features as provided in detail above with reference to FIGS. 1A and 1B.

The transmission 200 may be coupled to an electric motor (e.g., a PM motor) via a splined coupling, and may transmit power from the electric motor to drive wheels of a vehicle through a first set of gears 256, a second set of gears 264, and a third set of gears 250, before transmitting power to a gear 240 (e.g., a ring gear) coupled to a case 248 of a differential 230. Additionally, components of the transmission 200 may be included within a transmission boundary 274.

The first set of gears 256 may include the splined segment 262 of the first shaft 213, which may intermesh with an output shaft of the electric motor. The first set of gears 256 may include components mechanically coupled to first shaft 213, including (moving from a negative x-direction to a positive x-direction) the splined segment 262 of the first shaft 213, a first bearing 260, a first gear 258, and a second bearing 222. The first gear 258 may intermesh with a second gear 218 of the second set of gears 264, while the first bearing 260 and the second bearing 222 may permit rotation of the first shaft 213 with respect to a housing (e.g., the housing 103 of FIGS. 1A-B), as explained in relation to FIG. 1B. The second set of gears 264 may include components mechanically coupled to second shaft 266, including (moving from a negative x-direction to a positive x-direction) a third bearing 270, a third gear 268, the second gear 218, and a fourth bearing 220.

The second gear 218 of the second set of gears 264 may intermesh with the first gear 258 of the first set of gears 256, and the third gear 268 of the second set of gears 264 may intermesh with a fourth gear 252 of the third set of gears 250, while each of the third bearing 270 and the fourth bearing 220 may permit rotation of the second shaft 266 with respect to the housing. Similarly, the third set of gears 250 may include components mechanically coupled to third shaft 244, including (moving from a negative x-direction to a positive x-direction) the fifth bearing 254, the fourth gear 252, the fifth gear 246, and the sixth bearing 242. The fourth gear 252 of the third set of gears 250 may intermesh with the third gear 268 of the second set of gears 264, and the fifth gear 246 may intermesh with the gear 240 of the differential 230, while each of the fifth bearing 254 and the sixth bearing 242 may permit rotation of the third shaft 244 with respect to the housing.

The differential 230 may be configured to transmit the rotational power generated from the electric motor and induced in the differential via the rotational motion of each of the first set of gears 256, the second set of gears 264, and the third set of gears 250, to an output shaft, in order to rotate drive wheels of a vehicle, as explained in relation to FIGS. 1A-B. The components included in the differential 230 may include (moving from a negative x-direction to a positive x-direction) the case 248, a return spring 272, a flange 238 that projects radially outward from the differential, the solenoid actuator 236 mechanically coupled to the differential case 248, a bracket 224 mechanically coupled to the solenoid actuator 236, and a sixth bearing 232.

The solenoid actuator 236 and the return spring 272 may be utilized in order to couple/decouple the transmission 200 from the drive wheels of the vehicle, e.g. based on a vehicle control strategy. The solenoid actuator 236 may receive electric power from the controller 105, shown in FIG. 1A and may be switched on/off in order to disengage/engage a dog clutch (such as the dog clutch 390, shown in FIG. 3) in a disconnect assembly 233 of the differential 230. Positioning the dog clutch of the disconnect assembly 233 in the differential reduces losses in the driveline when compared to disconnect devices positioned closer to the motor. Consequently, vehicle efficiency and range may be increased. The dog clutch may be incorporated into the housing 103 of the gearbox 100, shown in FIG. 1A. The housing 103 further encloses the differential 230 and therefore may also function as a differential housing. However, in other examples, the gearbox and the differential may have separate housing structures.

Engagement of the dog clutch may serve to couple the electric motor to the drive wheels of the vehicle (e.g., an engagement condition of the electric motor), while disengagement of the dog clutch may serve to decouple the electric motor from the drive wheels of the vehicle (e.g., a disengagement condition of the electric motor). The disengagement condition may be desired based on a vehicle control strategy or based on a vehicle operator command. Alternatively, the disengagement condition may stem from power to the electric motor being unintentionally discontinued. The return spring 272 may be used to disengage the dog clutch during the disengagement condition. For instance, the return spring 272 may store energy when the dog clutch is disengaged to prevent unintended engagement of the dog clutch 390. As such the spring may urge the clutch back into the disengaged position once the solenoid is deactivated. Further explanation of the solenoid actuator 236 and the mechanism for coupling/decoupling the electric motor to the drive wheels of the vehicle as part of operation of the differential 230 is continued in relation to FIGS. 3-5.

Figure 3:
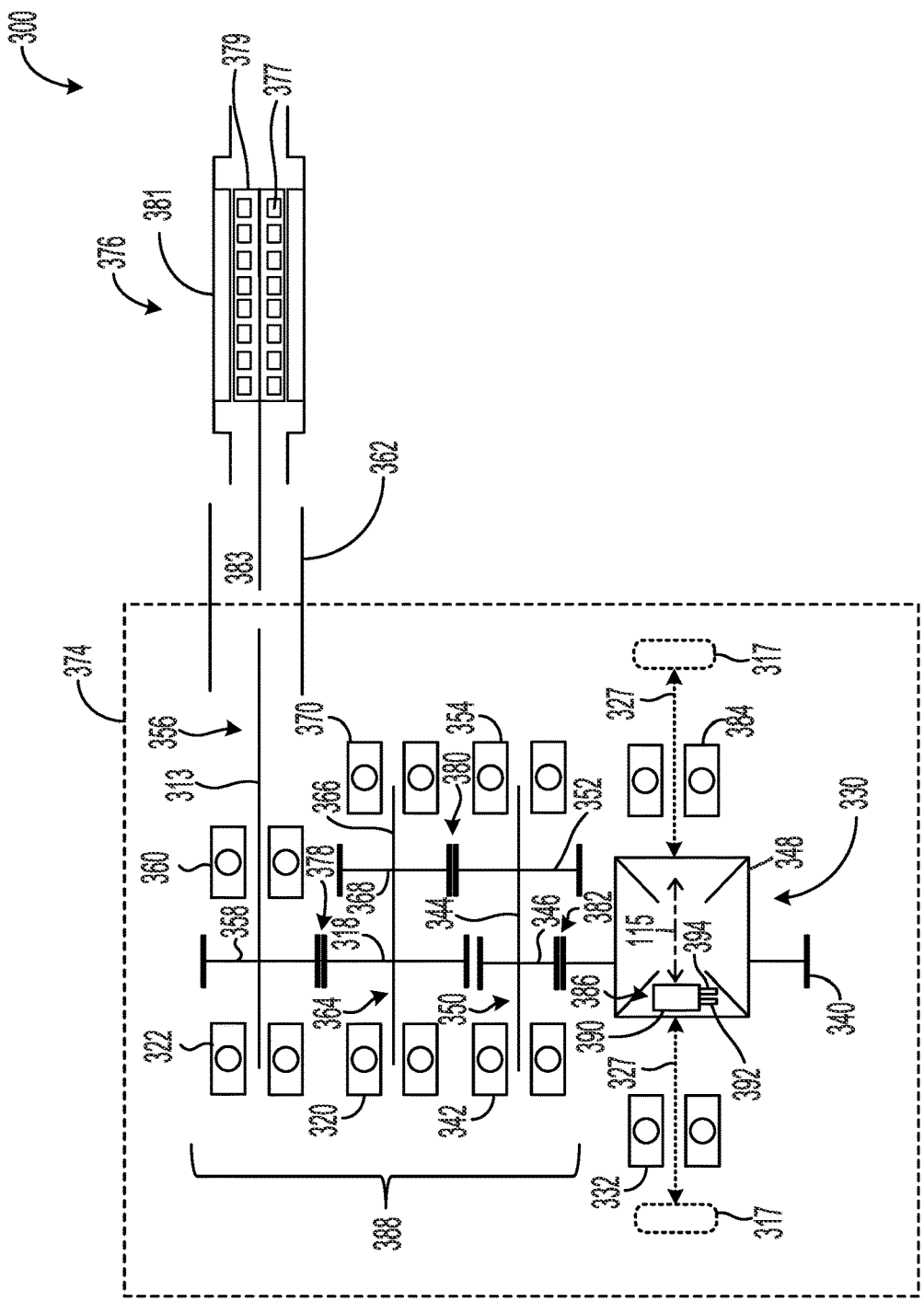
FIG. 3 shows a stick diagram of the transmission as shown in FIG. 2.

FIG. 3 shows a stick diagram of a transmission system 300. The transmission system 300 may share at least some similar components to components included within the transmission system 200 of FIG. 2 as well as the other transmission systems described herein. It will be appreciated that these overlapping components of the stick diagram of the transmission system 300 may have similar structures and/or functions to components of the transmission 200 may be labeled with corresponding numbers, prefixed with a "3" instead of a "2". For example, the solenoid actuator 236 may be substantially similar to the solenoid actuator 136. Accordingly, only additional features of the transmission 200 or those features of the viewing transmission having significant configurational distinctions from corresponding features illustrated in the transmission system 300 may be described in detail below. Description of other features of the transmission system 300 may be supplemented by description of the corresponding features as provided in detail above with reference to FIG. 2.

FIG. 3 illustrates a transmission boundary 374. The transmission system 300 may schematically show the couplings between transmission components, in addition to coupling of the transmission system 300 to the electric motor 376 via a spline coupling 362. It will be understood that gears of a geartrain 388 may intermesh as part of a single-speed transmission, in order to transmit power from the electric motor 376 to the differential 330 via the gear 340. For example, the interface of the first gear 358 of the first set of gears 356 and the second gear 318 of the second set of gears 364 (formed as a gear mesh) is illustrated at 378. The interface of the third gear 368 of the second set of gears 364 and the fourth gear 352 of the third set of gears 350, formed as a gear mesh is illustrated at 380. Further, the interface of the fifth gear 346 of the third set of gears 350 and the gear 340 formed as a gear mesh is illustrated at 382.

The electric motor 376 may be a PM motor with permanent magnets 377 embedded in the rotor 379. The motor 376 further includes a stator 381 that electromagnetically interacts with the rotor during motor operation. The electric motor may be designed to operate in a forward drive mode where the rotor is spun in a first rotational direction and a reverse drive mode where the rotor is spun in an opposite rotational direction. The motor may be further designed to operate in a regeneration mode where the motor receives mechanical power from the transmission and generates electrical energy which may be transferred to an energy storage device (e.g., a traction battery, a capacitor, combinations thereof, and the like). The rotor 379 further includes a rotor shaft 383 that may be mechanically coupled to the input shaft 313 via a splined connection and/or other suitable mechanical connection such as welds, a gear reduction, a chain, and the like. However, it will be appreciated that connecting the rotor shaft 383 directly to the input shaft 313 increases the electric drive unit's compactness.

Further, the gear 340 is mechanically coupled to and driving the rotational motion of the differential 330. Additionally, rotational motion of the gears (and the shafts coupled thereto) within a housing (such as split housing 103 of FIGS. 1A-B), may be mediated by bearings. In particular, the first bearing 322 and the second bearing 360 may permit co-rotation of the each of the input shaft 313 and the first gear 358 with respect to the housing, the third bearing 370 and the fourth bearing 320 may permit co-rotation of each of the layshaft 366, the second gear 318, and the third gear 368 with respect to the housing, the fourth bearing 342 and the fifth bearing 354 may permit co-rotation of each of the output shaft 344, the fourth gear 352, and the fifth gear 346 with respect to the housing, and the sixth bearing 332 and the seventh bearing 384 may permit co-rotation of the gear 340 and the differential 330 with respect to the housing.

Further illustrated in the stick diagram of the transmission system 300 is the differential 330, including the disconnect assembly 386. The disconnect assembly 386 may be configured to allow the differential 330 to be selectively decoupled from drive wheels 317. As such, the disconnect assembly may be designed to permit mechanical power flow between the differential 330 and the drive wheels 317 when a dog clutch 390 in the disconnect assembly 386 is engaged and conversely inhibit mechanical power flow from the differential 330 and the drive wheels 317.

The mechanical connection which may be established via axle shafts, between the drive wheels 317 and the differential 330 is represented via dashed lines 327. The dog clutch 390 may include toothed interfaces designed to selectively mate with one another to permit the aforementioned power transfer functionality. A solenoid 392 may further be included in the disconnect assembly 386. The solenoid 392 may receive electrical power from a controller which induces solenoid actuation. For instance, the controller (e.g., the controller 105, shown in FIG. 1A) may be designed to transfer 10 amperes (amps) or less to the solenoid 392 for actuation. Conversely, to transition to dog clutch engagement, electric power may be applied to the solenoid 392 which urges the toothed interfaces into engagement such that the torque is transferred through the clutch. Conversely, during disengagement, a spring 394 coupled to the dog clutch 390 disengages the clutch to decouple a differential case 348 from the differential gear 340 (e.g., the differential ring gear).

Figure 4:
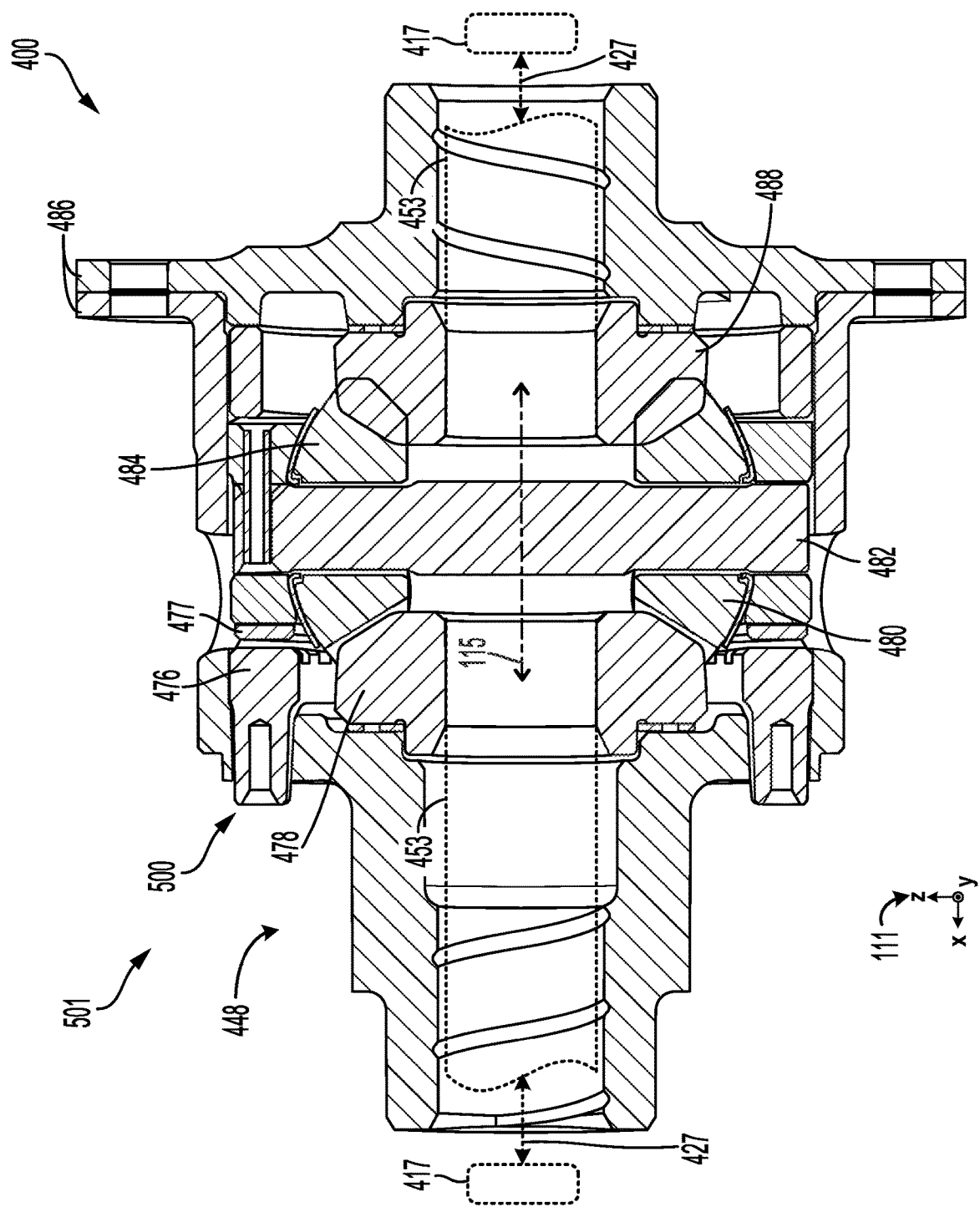
FIG. 4 shows a cross-sectional view of a differential of the transmission of FIG. 1B.

FIG. 4 shows an example embodiment of a differential 400. The example embodiment of the differential 400 may share at least some of the structural and functional features with the differential 230 of FIG. 2.

The differential 400 may include a case 448 which may be designed in multiple sections 486. The case 448 may include a gear (e.g., a ring gear) that meshes with a gear in the gearbox (e.g., the gear 346, shown in FIG. 3). As such, the differential may be mechanically coupled to an electric motor by way of a gearbox.

The differential 400 may include a shaft 482 on which gears 480, 484 (e.g., pinion gears) reside. The gears 480, 484 may rotate with respect to the longitudinal axis of the shaft 482. Each of the gears 480, 484 may be coupled to both side gears 478, 488 via intermeshing. In particular, the teeth of the gear 480 may intermesh with the respective teeth of each of the side gears 478, 488, and similarly the teeth of the gear 484 may intermesh with the respective teeth of each of the side gears 478, 488. In turn, the side gears 478, 488 may be coupled to axle shafts 453 (e.g., a pair of axle shafts) via splined engagement and/or other suitable mechanical attachment. The axle shafts 453 may be in turn rotationally coupled to the drive wheels 417, as indicated via arrows 427.

The transfer of rotational power from the differential 400 to the drive wheels 417 may be initiated via a dog clutch 500 in a disconnect assembly 501. The dog clutch may include (moving from a negative x-direction to a positive x-direction) a first interface 476 and a second interface 477. The first interface 476 may be incorporated into the differential case 448 and rotates with the differential case. Conversely, the second interface 477 may be coupled to the gears 480, 484 and/or the shaft 482 and rotate therewith. As such, when the first and second interfaces 476 and 477 are engaged, mechanical power can be transferred between the differential and the axle shafts and drive wheels correspondingly. Conversely, when the first and second interfaces are disengaged, mechanical power transfer between the differential and the axle shafts is inhibited. In this way, when the dog clutch is disengaged the drive wheels are decoupled from the gearbox and electric motor, correspondingly, thereby increasing driveline efficiency.

FIG. 5 shows an embodiment of a dog clutch 500 including the first interface 476 and the second interface 477. The dog clutch 500 may be included as part of the transmissions and electric drive units described herein.

The first interface 476 may be positioned on an axial side 479 of a first body 481 (e.g., a first plate). Likewise, the second interface 477 may be positioned on an axial side 483 of a second body 485 (e.g., a second plate). The teeth in the interfaces therefore extend in axial directions away from the respective bodies. However, other dog clutch arrangements have been contemplated.

The first body 481 may be incorporated into the case of the differential and rotates therewith, as previously discussed. Further, the second body 485 may be coupled to the pinion gears and/or shaft coupling the pinion gears.

The first interface 476 includes a first set of teeth 598, as shown in inset 590. Each tooth in the first set of teeth 598 may be the same or substantially similar in design, and the first set of teeth 598 may be disposed along a circumference of the first interface 476. Between each pair of adjacent teeth of the first set of teeth 598 of the first interface 476 is a first spacing 594 between adjacent teeth, which may the same or substantially similar for each pair of adjacent teeth. The first spacing 594 may be profiled to allow intermeshing with a second plurality of teeth 596, as shown in inset 590.

Similarly, the second interface 477 may include a second set of teeth 596, as shown in inset 590. Each tooth of the second set of teeth 596 may be the same or substantially similar in design, and the second set of teeth 596 may be disposed along a circumference of the second interface 477 facing towards the first set of teeth 598. Between each pair of adjacent teeth of the second set of teeth 596 of the first interface 476 is a second spacing 592 between adjacent teeth, which may be the same or substantially similar for each pair of adjacent teeth. The second spacing 592 may be profiled to allow intermeshing with the first set of teeth 598 of the first interface 476. In other words, during engagement of the dog clutch, teeth in the first interface 476 and the second interface 477 are intermeshed to facilitate power transfer therethrough in opposing rotational directions. The teeth may be asymmetrically profiled with regard to a drive flank and a coast flank to enable clutch to be more quickly disengaged with less force. As such, a spring coupled to the dog clutch, elaborated upon herein, may be downsized, which correspondingly allows for a downsizing of the solenoid coupled to the dog clutch. Consequently, the size and power demands of the disconnect assembly can be reduced, if desired. The profiling of the teeth is expanded upon herein with regard to FIG. 6.

A solenoid 550 coupled to the first interface 476 is further schematically depicted in FIG. 5. A spring 554 may be coupled to the first interface 476 and may be designed to be in a neutral state when the dog clutch is disengaged. Conversely, when the dog clutch is engaged, the spring 554 may be in a compressed position. Arrow 552 denotes the direction that the solenoid urges the first interface 476, when it is energized. As such, energization of the solenoid induces dog clutch engagement. Conversely, to disengage the dog clutch, solenoid energization is discontinued and the compressed spring 554 urges the dog clutch into its disengaged position by returning to a neutral position. In this way, the dog clutch may be disengaged when solenoid energization is stopped. The dog clutch 500 is shown in a disengaged position in FIG. 5 where the first interface 476 and the second interface 477 are spaced away from one another and the teeth in the interfaces are decoupled. Conversely, during engagement, teeth in the first and second interfaces 476 and 477 are mated with one another and permit torque transfer through the interfaces.

FIG. 6 shows a first interface 601 and a second interface 600 that are included in a dog clutch. These interfaces 600 and 601 are examples of the first interface 476 and the second interface 477 included in the dog clutch 500, shown in FIGS. 4-5.

A tooth 602 in the first interface 601 is depicted intermeshing with teeth 642 of the second interface 600. To elaborate, the tooth 602 mates with a recess 603 between two of the teeth 642.

The tooth 602 include a coast flank 608 and a drive flank 606. The drive flank 606 may have a drive surface 614 that forms to an angle 618 with respect to a normal line 609 (which is parallel to the x-axis of axis system 111), while the coast flank 608 has a coast surface 616 that forms an angle 620 with respect to a normal line 612. The angle 620 is greater than the angle 618. The coast flank 608 may therefore be less shallow than the drive flank. In one example, the angle 618 may be in a range of 0°-5° and the angle 620 may in the range of 10°-20°.

Correspondingly, the slope of the corresponding coast flank 644 of one of the teeth 642 matches match the slope of the coast flank 608 of the tooth 602. Further, the slope of the corresponding drive flank 646 of one of the teeth 642 matches the drive flank 606 of the tooth 602. As such, when the second interface 601 is rotating in a drive direction 643, force is transferred between the first and second interfaces 600 and 601 via the contact between the drive flanks 606 and 646. As such, the drive flank 606 of the tooth 602 experiences a drive torque 638 from the upstream components (e.g., the gearbox and ultimately the electric motor). The drive torque 638 has a lever arm 630, and with a drive force 632 acting along axis 604 (which is parallel to the y-axis), including a first component 634 perpendicular to the drive flank 606, and a second component 636 parallel to the drive flank.

Conversely, when a torque reversal occurs and the first interface 600 rotates in a direction 645 (opposite drive direction 643) when the electric motor loses power which may occur unexpectedly. This rotational condition may also occur during regeneration operation where the motor generates electric energy, or during reverse operation when the motor spins the transmission in an opposite direction of the forward drive mode. When the electric motor ceases to provide mechanical power to the transmission and therefore the transmission, the coast flank 608 of the tooth experiences a drag torque 640 (with a lever arm 628) which stems from the magnet drag generated via the electric motor.

It may be desirable to disengage the dog clutch when the motor loses electrical power, either unexpectedly or in response to operator interaction with an input device (e.g., a drive mode selector) to alter the configuration of the electric drive unit (e.g., switch from a four-wheel drive mode to a two-wheel drive mode). However, when the electric motor is a permanent magnet motor, the motor generates magnetic drag after the electric power to the motor is discontinued, as previously discussed. This magnetic drag torque results in trapped torque. For instance, in one use-case example, the trapped torque may be approximately 68 newton meters (Nm).

Due to the latency in the controller, the vehicle controller may not be able to energize the solenoid quickly enough to disengage the dog clutch prior to generation of magnetic drag torque in the motor. By profiling the coast flank 608 with larger angle, with regard to the normal line, the force demanded for dog clutch disengagement is reduced. To elaborate, the increase in the angle 620 of the coast flank 608, allows the force component to be effectively added to the disengagement force and also reduced the normal force on the dog tooth. In other words, the angle 620 of the coast flank is greater than the angle 618, in order to reduce the first force component 624 of the drag force 622 on the coast flank and normal thereto. By reducing the first force component 624 of the drag force 622, normal to the tooth, on the coast flank 608, and increasing the second force component 626 of the drag force 622, parallel to the tooth flank angle, the disengagement force for separating the clutch interfaces is reduced. Consequently, the dog clutch may be disengaged with less solenoid force than a dog clutch with symmetric tooth angles that are closer to zero degrees with regard to normal lines.

Reduction of the disengagement force required to separate the dog clutch interfaces allows for a lower amount of force demanded by the spring to separate the interfaces as part of disengagement of the electric motor from the drive wheels. The result of the lower spring force is a lower solenoid force demanded for engagement which allows for a smaller physical size of the solenoid. For example, in one example dog clutch, the torque demanded for disengagement may be 20 Nm, which may be achievable with a solenoid actuator with an upper operating threshold of 10 Amperes (amps).

Furthermore, the angle 618 of the drive flank 606 may be selected in order to maintain a sufficient drive torque 638 applied to the drive flank 606 during motor operation. Correspondingly, the angle 620 of the coast flank 608 may be selected in order to reduce the disengagement force required to decoupled the toothed interfaces, while also achieving reverse torque requirements for vehicle operation, as well as regenerative braking torques. Further, in FIG. 6, an axial surface 650 of the tooth 602 and an axial surface 652 of the recess 603 are shown. These axial surfaces intersect the coast flank 608 and the drive flank 606.

FIG. 7 shows an example method 700 to operate a disconnect assembly (such as disconnect assembly 386 of FIG. 3) of a differential (such as differential 130 of FIG. 1B) of a transmission (such as transmission system 300 of FIG. 3) in a vehicle (such as vehicle 101 of FIGS. 1A-B). Method 700 will be described in reference to the systems described herein and with regard to FIGS. 1A-6, but it should be understood that similar methods may be applied to other systems without departing from the scope of this disclosure. Method 700 and the other methods described herein may be carried out by vehicle controller 105, and may be stored at the controller 105 in memory 107. Instructions for carrying out method 700 may be executed by the vehicle controller 105 in conjunction with signals received from sensors of the vehicle, such as the sensors described above with reference to FIG. 1A. The controller may employ actuators of the vehicle system to adjust operation of the vehicle, according to the methods described below.

At 702, the method includes determining operating conditions of the vehicle. Determining operating conditions of the vehicle may include determining the amount of power supplied to an electric motor (such as electric motor 376 of FIG. 3). Additional operating conditions may include the speed of the electric motor, torque applied to drive wheels (such as drive wheels 317 of FIG. 3) of the vehicle by the electric motor, and the configuration of the disconnect assembly (such as disconnect assembly 386 of FIG. 3). In one example, determining the speed of the electric motor may be accomplished via a motor speed sensor mounted an output shaft or calculated based on the current supplied to the motor via an inverter. Determining torque production of the PM motor may include estimating the power supply to the electric motor from a traction battery via an inverter by the vehicle controller. Further, determining the operating condition of the disconnect assembly may include determining the current supplied to a solenoid actuator (such as solenoid actuator 236 of FIG. 2) via the vehicle controller.

At 704, the method includes determining if the power supplied to the electric motor is discontinued. The motor may unintentionally lose power, due to inverter and/or traction battery degradation. However, in other examples, motor power may be discontinued in response to operator input. For instance, an operator may interact with a drive mode selector which discontinues operation of the drive axle. Such a determination may be carried out by monitoring the current at the output of the inverter that is delivered to the electric motor. However, other techniques for determining if the motor has lost power have been contemplated.

If it is determined that motor power has not been discontinued (NO at 704) the method moves to 706. At 706, the method includes sustaining the current electric drive unit operating strategy. For instance, current supplied to the solenoid may be sustained to maintain dog clutch engagement and the motor may continue to operate to deliver mechanical power to the gearbox.

If it is determined that the power supplied to the electric motor has been discontinued (YES at 704), the method moves to 708. At 708, the method includes disengaging a dog clutch of the disconnect assembly by removing current to the solenoid actuator. By removing current to the solenoid actuator, the spring urges the dog clutch into its disengaged position, thereby decoupling the differential from the electric motor, which in turn decouples the drive wheels from the electric motor. In this way, solenoid de-energization may trigger dog clutch disengagement. Following 706, method 700 then ends.

FIG. 8 shows an example timeline 800 associated with a use-case disconnect technique for a differential in an electric drive unit. This disconnect technique may be implemented in any of the previously described electric drive units or combinations of the electric drive units. Although specific values are not indicated in FIG. 8, the abscissas denote time which increases from left to right with points of interest t1 and t2 provided thereon. Further, the operating conditions indicated on the ordinates for plots 802 and 804 increase in a vertical direction. Plot 802 specifically indicates the power supplied to the electric motor, plot 804 indicates the current supplied to the solenoid, and plot 808 indicates the dog clutch state (engaged and disengaged).

Prior to t1, the electric motor is receiving electric power. Correspondingly, the power to the electric motor is indicated by the vehicle controller, current is supplied to the solenoid, the dog clutch is fully engaged.

At t1, power to the electric motor drops to zero. Next at t2, in response to the power loss at the electric motor, current supply to the solenoid is discontinued which causes dog clutch to disengage. It will be understood that when a permanent magnet motor is used, drag torque may be generated by the motor from t1 to t2. As such, the spring may be sized to overcome the drag torque.

The technical effect of the method for operating the electric drive unit described herein is to decrease the force demanded for dog clutch disengagement in a clutch included in a disconnect assembly in differential or an electric drive unit. Consequently, the clutch may be more efficiently and rapidly disengaged. Consequently, performance of the electric drive unit is enhanced.

FIGS. 1A-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a system for an electric drive unit is provided. The system comprises a dog clutch positioned in a differential, configured to selectively mechanically decouple an electric motor from one or more drive wheels, and including a first interface designed to selectively engage a second interface, wherein each of the first interface and the second interface include a plurality of teeth, each tooth in the plurality of teeth includes a drive flank and a coast flank, and the coast flank has a first tooth angle greater than a second tooth angle of the drive flank.

In another aspect, an electric drive unit is provided that comprises a permanent magnet (PM) motor; a transmission mechanically coupled to the PM motor and including a differential; a disconnect assembly included within the differential, the disconnect assembly comprising: a dog clutch designed to selectively decouple the PM motor from one or more drive wheels and including a first interface designed to selectively engage a second interface, wherein the first interface includes a plurality of teeth, each tooth in the plurality of teeth includes a drive flank and a coast flank, and the coast flank has greater tooth angle than the drive flank; and a solenoid coupled to the dog clutch; and a controller including instructions stored in a non-transitory memory that when executed cause the controller to: apply a current to the solenoid to disengage the dog clutch.

In yet another aspect, a method for operating an electric drive unit is provided that comprises disengaging a dog clutch in a disconnect device of a differential; wherein disengaging the dog clutch includes removing current to a solenoid that is designed to engage the dog clutch; and wherein the dog clutch includes a plurality of teeth, each tooth in the plurality of teeth includes a drive flank and a coast flank, and the coast flank has greater tooth angle than the drive flank.

In any of the aspect or combinations of the aspects, the system may further comprise a spring positioned within a differential case and designed to disengage the dog clutch in response to the solenoid de-energization.

In any of the aspect or combinations of the aspects, the system may further comprise a controller including instructions stored in non-transitory memory that when executed, in response to cessation of electric energy delivery to the electric motor, cause the controller to: de-energize the solenoid to disengage the dog clutch.

In any of the aspect or combinations of the aspects, the solenoid may have a 10 ampere upper operating threshold.

In any of the aspect or combinations of the aspects, the system may further comprise a return spring within a differential case and designed to disengage the dog clutch in response to solenoid de-energization.

In any of the aspect or combinations of the aspects, the electric motor may be a permanent magnet (PM) motor.

In any of the aspect or combinations of the aspects, the differential may be included in a single-speed transmission that is coupled to the electric motor.

In any of the aspect or combinations of the aspects, the single-speed transmission may be a three-stage transmission.

In any of the aspect or combinations of the aspects, the current delivered to the solenoid may be discontinued in response to the PM motor losing power.

In any of the aspect or combinations of the aspects, the current delivered to the solenoid may be discontinued in response to the controller receiving an operator induced disengagement command.

In any of the aspect or combinations of the aspects, the solenoid may be incorporated into a housing of the differential.

In any of the aspect or combinations of the aspects, the current may be less than or equal to 10 amperes.

In any of the aspect or combinations of the aspects, the transmission may be a single speed transmission.

In any of the aspect or combinations of the aspects, the current supplied to the solenoid may be automatically discontinued in response to the PM motor losing power.

In any of the aspect or combinations of the aspects, the current supplied to the solenoid may be automatically discontinued subsequent to generation of drag torque by the PM motor.

In any of the aspect or combinations of the aspects, the current may be applied to the solenoid in response to operator interaction with a drive mode selector.

In any of the aspect or combinations of the aspects, the current may be applied to the solenoid based on a change in one or more vehicle operating conditions.

Note that the example control and estimation routines included herein can be used with various electric powertrain and/or vehicle configurations. The control methods and routines disclosed herein may be stored as executable instructions in non-transitory memory and may be carried out by the control system including the controller in combination with the various sensors, actuators, and other electric motor hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the electric motor control system, where the described actions are carried out by executing the instructions in a system including the various electric motor hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to various types of electric motors and powertrain configurations. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an electric drive unit, comprising:
a dog clutch positioned in a differential, the dog clutch configured to selectively mechanically decouple an electric motor from one or more drive wheels, and including a first interface designed to selectively engage a second interface, the first interface incorporated in a differential case of the differential and configured to rotate with the differential case, the second interface coupled to one or more gears and/or a shaft of the differential that couple to the one or more drive wheels, wherein the electric motor is configured to rotate the differential case;

wherein each of the first interface and the second interface include a plurality of teeth, each tooth in the plurality of teeth includes a drive flank and a coast flank, and the coast flank has a first tooth angle that is greater than a second tooth angle of the drive flank, and wherein, when the first interface rotates in a drive direction, force is transferred between the first interface and the second interface via contact between drive flanks of the first interface and drive flanks of the second interface.

2. The system of claim 1, further comprising a solenoid configured to engage the dog clutch in response to energization of the solenoid.

3. The system of claim 2, further comprising a controller including instructions stored in non-transitory memory that when executed, in response to cessation of electric energy delivery to the electric motor, cause the controller to:
de-energize the solenoid to disengage the dog clutch.

4. The system of claim 3, wherein the solenoid has a 10 ampere upper operating threshold.

5. The system of claim 3, further comprising a return spring positioned within a differential case and designed to disengage the dog clutch in response to solenoid de-energization.

6. The system of claim 1, wherein the electric motor is a permanent magnet (PM) motor.

7. The system of claim 1, wherein the first tooth angle of the coast flank is greater than 10 degrees.

8. The system of claim 1, wherein the differential is included in a single-speed transmission that is coupled to the electric motor.

9. The system of claim 8, wherein the single-speed transmission is a three-stage transmission.

10. An electric drive unit, comprising:
a permanent magnet (PM) motor;
a transmission mechanically coupled to the PM motor and including a differential;
a disconnect assembly included within the differential, the disconnect assembly comprising:
a dog clutch designed to selectively decouple the PM motor from one or more drive wheels and including a first interface designed to selectively engage a second interface, wherein the first interface includes a plurality of teeth, each tooth in the plurality of teeth includes a drive flank, an axial surface, and a coast flank, the drive flank configured to experience a drive torque from the PM motor and transmit the drive torque to the second interface, and the coast flank has a first tooth angle that is in a range of 10-20 degrees relative to a first normal line that is perpendicular to the axial surface and the drive flank has a second tooth angle in a range of 0-5 degrees relative to a second normal line that is perpendicular to the axial surface; and
a solenoid coupled to the dog clutch; and
a controller including instructions stored in a non-transitory memory that when executed cause the controller to:
remove a current to the solenoid to disengage the dog clutch.

11. The electric drive unit of claim 10, wherein the current is removed to the solenoid in response to the PM motor losing power.

12. The electric drive unit of claim 10, wherein the current is removed to the solenoid in response to the controller receiving an operator induced disengagement command.

13. The electric drive unit of claim 10, wherein the solenoid is incorporated into a housing of the differential.

14. The electric drive unit of claim 10, wherein the current is less than or equal to 10 amperes.

15. The electric drive unit of claim 10, wherein the transmission is a single speed transmission.

16. A method for operating an electric drive unit including a permanent magnet (PM) motor, comprising:
delivering power to the PM motor and transmitting rotational energy of the PM motor to one or more drive wheels via a dog clutch in a disconnect device of a differential;
detecting a loss of power to the PM motor, and, in response, disengaging the dog clutch;
wherein disengaging the dog clutch includes discontinuing a current supplied to a solenoid that is coupled to the dog clutch, and wherein the current supplied to the solenoid is automatically discontinued subsequent to generation of drag torque by the PM motor; and
wherein the dog clutch includes a plurality of teeth, each tooth in the plurality of teeth includes a drive flank and a coast flank, and the coast flank has greater tooth angle than a tooth angle of the drive flank.

17. The method of claim 16, wherein the current to the solenoid is discontinued in response to operator interaction with a drive mode selector.

18. The method of claim 16, wherein the current to the solenoid is discontinued based on a change in one or more vehicle operating conditions.

* * * * *